United States Patent Office 3,396,133
Patented Aug. 6, 1968

3,396,133
PLASTIC COMPOSITIONS
Robert Leitch Forman, Runcorn, and Peter Hill, Blackley, Manchester, England, assignors to Imperial Chemical Industries Limited, London, England, a corporation of Great Britain
No Drawing. Filed Nov. 25, 1964, Ser. No. 414,014
Claims priority, application Great Britain, Dec. 4, 1963, 47,940/63
15 Claims. (Cl. 260—28.5)

ABSTRACT OF THE DISCLOSURE

Polymer compositions comprising a chlorine-containing polymer derived from a polymerizable vinyl compound, e.g., vinyl chloride polymers and chlorinated polyolefins, stabilized with a mixture of iron oxide and basic magnesium compound, notably magnesium oxide.

---

This invention relates to plastic compositions and more particularly to plastic polymer compositions comprising a chlorine-containing polymer derived from a polymerizable vinyl compound.

In compounding polymer compositions comprising polymers derived from vinyl compounds it is often necessary to include a so-called primary plasticizer, commonly an organic ester such as dioctyl phthalate or tritolyl phosphate. A so-called plasticizer extender, such as a chlorinated paraffin, may also be included.

Stabilizers such as metallic soaps, organic chelating agents and/or epoxides are often incorporated with the object of preventing the deterioration of the polymer composition which may occur in use or under the conditions encountered in compounding and/or fabricating operations. Such deterioration may result in severe discolouration, or even disintegration, of the polymer composition.

We have now found that surprisingly effective stabilization of compositions comprising the said chlorine-containing polymers can be achieved by incorporating therein a basic magnesium compound together with iron oxide.

Thus according to the present invention we provide a composition comprising a basic magnesium compound, iron oxide and a chlorine-containing polymer derived from a polymerizable vinyl compound.

Suitable basic magnesium compounds include magnesium oxide, magnesium hydroxide and basic magnesium salts of organic acids or of phenols, for example magnesium laurate, stearate or phenate. The preferred basic magnesium compound is magnesium oxide. The preferred form of iron oxide is red iron oxide, but other forms of iron oxide, for example yellow iron oxide, may also be used.

The chlorine-containing polymer may be, for example, polyvinyl chloride, chlorinated polyvinyl chloride or a chlorinated polyolefin. The polymer may suitably comprise between 20 and 98% by weight of the total composition.

When a chlorinated paraffin is present this may contain, for example, between 10 and 26 carbon atoms in the molecule and between 40% and 70% chlorine.

Suitable proportions of the basic magnesium compound (calculated as MgO) are between 0.25 and 5 parts by weight, preferably between 0.5 and 2 parts by weight, per hundred parts by weight of the polymer component. Some stabilizing effect may be obtained when proportions below this range are used; higher proportions may also be used if desired.

Suitable proportions of iron oxide are between 0.5 and 5 parts by weight, preferably between 2 and 4 parts by weight, per hundred parts by weight of the polymer component; higher or lower proportions may also be used, but it is preferred that for every 100 parts by weight of iron oxide there should be present at least 2 parts by weight of the basic magnesium compound (calculated as MgO).

It is preferred to include a plasticizer of the organic ester type. Suitable proportions of the plasticizer are from 1 to 60 parts by weight per hundred parts by weight of the total composition but higher or lower proportions may be used. Dioctyl phthalate is a preferred plasticizer.

Compositions according to the present invention may be widely used, for example in the manufacture of floor tiles and other forms of floor covering.

The invention is illustrated but not limited by the following examples, in which parts are parts by weight.

Example 1

A polymer composition (composition A) was made by milling together at 140–160° C. for 13 minutes, the following constituents:

| | Parts |
|---|---|
| Polyvinyl chloride | 100 |
| Di-isooctyl phthalate | 36 |
| Chlorinated paraffin | 18 |
| Stearic acid | 0.3 |
| Red iron oxide | 3 |
| Magnesium oxide | 1 |

The chlorinated paraffin had been made by chlorination of paraffins containing 20–26 carbon atoms in the molecule; the chlorine content was 42% by weight.

The composition was formed into a sheet approximately 0.05 inch thick and one-inch sample squares cut from the sheet were heated at 175° C. in an oven with circulation of air. Sample squares were withdrawn from the oven at regular intervals over a period of 3 hours and the color and condition of the samples were noted.

The samples were brick-red in color before being heated and there was no change in color, nor was there any indication of charring or decomposition, after the 3-hour period of heating at 175° C.

By way of comparison, a polymer composition was made up from the same amounts of the same constituents as Composition A except that the magnesium oxide was omitted. The samples became black after heating at 175° C. for 15 minutes and had disintegrated at the end of the 3-hour period of heating.

Also by way of comparison a polymer composition was made up from the same amounts of the same constituents as Composition A except that the red iron oxide was omitted. The samples, which were clear and almost colorless initially, became black after heating at 175° C. for 15 minutes.

Further by way of comparison a polymer composition was made up from the same amounts of the same constituents as Composition A except that the magnesium oxide was omitted and that 4.5 parts of a commerically available stabilizer, comprising a mixture of barium and cadmium laurates together with an epoxidized soya-bean oil, were added. The samples, which were brick-red initially, had turned black and charred after heating at 175° C. for 45 minutes.

Example 2

A polymer composition (Composition B) was made up from the same amounts of the same constituents as Composition A except that the magnesium oxide was replaced by 1 part of magnesium hydroxide. The samples were brick-red initially, remained unchanged after heating for 1½ hours at 175° C., and turned black after heating for 2 hours at 175° C.

Example 3

A polymer composition (Composition C) was made by milling together, at 140–160° C. for 13 minutes, the following constituents:

| | Parts |
|---|---|
| Polyvinyl chloride | 100 |
| Di-isooctyl phthalate | 45 |
| Stearic acid | 0.3 |
| Red iron oxide | 3 |
| Magnesium oxide | 1 |

The composition was formed into a sheet and samples were tested as described in the preceding examples. The samples were brick-red initially and remained unchanged in appearance after the 3-hour period of heating at 175° C.

By way of comparison a polymer composition was made up from the same amounts of the same constituents as Composition C except that red iron oxide and the magnesium oxide were omitted. The samples were clear and almost colorless initially, became light brown after heating for 15 minutes at 175° C., dark brown after heating for 45 minutes, and black after heating for 1½ hours.

Example 4

A polymer composition was made by milling together, at 140–160° C., for 13 minutes, the following constituents:

| | Parts |
|---|---|
| Polyvinyl chloride | 100 |
| Di-isooctyl phthalate | 27 |
| Chlorinated paraffin | 27 |
| Red iron oxide | 3 |
| Magnesium laurate | 6 |

The chlorinated paraffin had been made by chlorination of paraffins containing 13–17 carbon atoms in the molecule; the chlorine content was 51% by weight.

The composition was formed into a sheet and samples were tested as described in the preceding examples.

The samples were brick-red in color before being heated and there was no change in color until heating had been continued at 175° C. for 1 hour, after which time black spots appeared. The samples became completely black after heating for 3 hours at 175° C.

By way of comparison a polymer composition was made up from the same amounts of the same constituents except that magnesium laurate was omitted and that 5.5 parts of a commercially available stabilizer, comprising a mixture of barium and cadmium laurates together with an epoxidized soya-bean oil, were added. The samples, which were brick-red initially, had turned completely black after heating at 175° C. for 45 minutes.

Example 5

A polymer composition was made by milling together, at 140–160° C. for 13 minutes, the following constituents:

| | Parts |
|---|---|
| Polyvinyl chloride | 100 |
| Di-isooctyl phthalate | 80 |
| Red iron oxide | 40 |
| Magnesium oxide | 1 |
| Calcium stearate | 1 |

The composition was formed into a sheet and samples were tested as described in the preceding examples.

The samples were brick-red in cloor before heating and there was no change in color after heating at 175° C. for 3 hours.

Example 6

A polymer composition was made by milling together, at 140–160° C. for 13 minutes, the following constituents:

| | Parts |
|---|---|
| Polyvinyl chloride | 100 |
| Di-isooctyl phthalate | 27 |
| Chlorinated paraffin | 27 |
| Calcium stearate | 1 |
| Yellow iron oxide | 3 |
| Magnesium oxide | 2 |

The chlorinated paraffin had been made by chlorination of paraffins containing 13–17 carbon atoms in the molecule; the chlorine content was 51% by weight.

The composition was formed into a sheet and samples were tested as described in the preceding examples.

The samples were yellow initially and became black only after being heated at 175° C. for 2 hours.

By way of comparison a composition was made up from the same amounts of the same constituents except that the magnesium oxide was omitted and 4.5 parts of a commercially available stabilizer, comprising a mixture of barium and cadmium laurates together with an epoxidized soya-bean oil, were added. The samples, which were yellow initially, became black after heating at 175° C. for 30 minutes.

Example 7

A polymer composition was made by milling together, at 120° C. for 13 minutes, the following constituents:

| | Parts |
|---|---|
| Chlorinated polyethylene | 100 |
| Red iron oxide | 3 |
| Magnesium oxide | 2 |
| Lubricant | 0.5 |

The chlorine content of the chlorinated polyethylene was 27% by weight.

The lubricant used is commercially available ester lubricant under the trade name "Ferrolube 993."

The composition was formed into a sheet and samples were tested as described in the preceding examples. The samples were brick-red initially and remained unchanged after heating at 175° C. for 2 hours.

By way of comparison a composition was made up from the same amounts of the same constituents except that the magnesium oxide was omitted and 4.5 parts of a commercially available stabilizer, comprising a mixture of barium and cadmium laureates together with an epoxidized soya-bean oil, were added. The samples became black after heating at 175° C. for 30 minutes.

Example 8

A rigid polymer composition was made from the following constituents by dry-blending at 120° C., followed by gelling at 170° C.:

| | Parts |
|---|---|
| Polyvinyl chloride | 100 |
| Glycerol monostearate | 3 |
| External lubricant | 0.5 |
| Magnesium oxide | 1 |
| Red iron oxide | 3 |

The external lubricant was a commercially available mixed-ester wax.

The composition was formed into a sheet and samples were tested as described in the preceding examples.

The samples were brick-red initially and remained unchanged after heating at 175° C. for 3 hours.

What we claim is:

1. A stabilized polymer composition comprising a polymer selected from the group consisting of chlorinated polyolefins and vinyl chloride polymers, and, as a stabilizer therefor, an effective amount of a mixture consisting essentially of magnesium oxide and yellow or red iron oxide.

2. A composition as claimed in claim 1 wherein the polymer is polyvinyl chloride.

3. A composition as claimed in claim 1 wherein the polymer is a chlorinated polyolefin.

4. A composition as claimed in claim 3 wherein the polymer is a chlorinated polyethylene.

5. A composition as claimed in claim 1 wherein the iron oxide is red iron oxide.

6. A composition as claimed in claim 5 wherein the proportion of the magnesium oxide is between 0.25 and 5 parts by weight per hundred parts by weight of the polymer component.

7. A composition as claimed in claim 6 wherein the proportion of magnesium oxide is between 0.5 and 2 parts by weight per hundred parts by weight of the polymer component.

8. A composition as claimed in claim 7 wherein the proportion of iron oxide is between 0.5 and 5 parts by weight per hundred parts by weight of the polymer component.

9. A composition as claimed in claim 8 wherein the proportion of iron oxide is between 2 and 4 parts by weight per hundred parts by weight of the polymer component.

10. A composition as claimed in claim 9 wherein the proportion of the magnesium oxide is at least 2 parts by weight per 100 parts by weight of iron oxide.

11. A composition as claimed in claim 1 comprising also an organic ester plasticizer.

12. A composition as claimed in claim 11 wherein the proportion of the plasticizer is between 1 part and 60 parts by weight per hundred parts by weight of the total composition.

13. A composition as claimed in claim 12 wherein the plasticizer is dioctyl phthalate.

14. A composition as claimed in claim 1 comprising also a chlorinated paraffin.

15. A composition as claimed in claim 1 wherein the proportion of the polymer is between 20 and 98 parts by weight per hundred parts by weight of the total composition.

References Cited
UNITED STATES PATENTS

| | | | |
|---|---|---|---|
| 2,403,215 | 7/1946 | Foster | 260—23 |
| 2,467,550 | 4/1949 | Fletcher et al. | 260—23 |
| 2,716,092 | 8/1955 | Leistner et al. | 260—23 |
| 2,745,819 | 5/1956 | Mack et al. | 260—45.75 |
| 2,837,490 | 6/1958 | Hecker | 260—23 |
| 3,261,793 | 7/1966 | Stevenson | 260—23 |

DONALD E. CZAJA, *Primary Examiner.*

W. E. PARKER, *Assistant Examiner.*